United States Patent Office 3,324,166
Patented June 6, 1967

3,324,166
PROCESS FOR THE MANUFACTURE OF
UNSATURATED NITRILES
Kurt Sennewald and Wilhelm Vogt, Knapsack, near Cologne, Alexander Ohorodnik, Berrenrath, near Cologne, and Hermann Vierling, Hurth, near Cologne, Germany, assignors to Knapsack Aktiengesellschaft, Knapsack, near Cologne, Germany, a corporation of Germany
No Drawing. Filed Aug. 27, 1963, Ser. No. 304,986
Claims priority, application Germany, Sept. 1, 1962,
K 47,645
8 Claims. (Cl. 260—465.3)

The present invention relates to a process for the manufacture of unsaturated nitriles by oxidizing olefins having 3 or 4 carbon atoms with air and/or oxygen in the presence of ammonia on a catalyst. The present invention relates more particularly to a process for the manufacture of acrylonitrile from propylene and of methacrylonitrile from isobutylene.

Various such processes which use catalysts of the most varied compositons have already been known, but all of them are associated with more or less serious disadvantages.

German Patent No. 897,560 describes a process for making unsaturated nitriles from $\alpha,\beta$-unsaturated aliphatic aldehydes or compounds yielding such aldehydes under the reaction conditions selected. The patent specifies (cf. page 2, lines 2 to 4) seven compounds yielding the desired unsaturated aldehydes, but these compounds do not include olefins.

German Patent No. 941,428 (patent of addition to Patent No. 897,560) is concerned with a two-stage process, wherein, in the first stage, an olefin is transformed in contact with selenium into an unsaturated aldehyde and various other compounds (cf. page 1, line 27), for example formaldehyde, acrylic acid and acetic acid (cf. page 2, line 72) and, in the second stage, the crude gas so obtained is transformed in contact with a catalyst other than that used in the first stage, preferably a copper or molybdenum catalyst, into acrylonitrile.

French Patent No. 1,098,400 describes a process very similar to that forming the subject of German Patent No. 941,428, which is preferably carried out in two stages with the formation of acrolein as an intermediary product, the process being carried out in contact with copper and molybdenum catalysts.

British Patent No. 744,011 (German Patent No. 1,070,170) is directed to a process for making unsaturated nitriles from $\alpha,\beta$-unsaturated aliphatic aldehydes or compounds yielding same under the reaction conditions selected with the exclusive use of a mixture of molybdenum and alkali metal compounds as the catalyst.

U.S. Patent No. 2,481,826 is concerned with a one-stage process wherein, under the conditions specified, e.g., in Example 6, which uses a catalyst containing vanadium, molybdenum and phosphorus, a temperature of 480° C. and a molar ratio of propylene to ammonia to air of 1:2:125, merely 6 mol percent of the propylene used are transformed into acrylonitrile, while 10 mol percent thereof are transformed into acetonitrile in a further 10 mol percent thereof are transformed into hydrocyanic acid. The catalyst used in this process is disadvantageous in failing to produce good total nitrile yields and in failing to exhibit selectivity. Speaking generally, it is stated that the successful use of catalysts containing vanadium pentoxide has previously been limited to the oxidation, for example, of benzene to maleic anhydride or of naphthalene to phthalic anhydride.

German Patent No. 1,127,351 as laid open to public inspection (corresponding to U.S. Patent No. 2,904,580; British Patent No. 867,438; Belgian Patent No. 571,200) describes the direct transformation of propylene with oxygen and ammonia into acrylonitrile and undesired acetonitrile in contact with catalysts containing bismuth, tin or antimony compounds on the one hand, and molybdenum, tungsten and optionally phosphorus compounds on the other. Example 1 in column 6 of the above German patent describes tests comparing the catalyst used therein with the vanadium-containing catalyst used in U.S. Patent No. 2,481,826, the catalysts being compared once under the conditions specified in Example 6 of that U.S. Patent and once under the conditions specified in Example 1 of German Patent No. 1,127,351. These tests indicate that the process described in U.S. Patent No. 2,481,826 is unsatisfactory. On the other hand, calculation from the data indicated in German Patent No. 1,127,351 (column 7, line 3) shows that even "catalyst B" forming the subject of that patent merely enables a maximum propylene conversion rate of 46.2:74.5=62% to be obtained in the other examples of that patent, the propylene conversion rates are still more reduced.

French Patent No. 1,219,512 is concerned in like manner with a process for the manufacture of unsaturated nitriles from olefins in contact with a catalyst consisting of molybdenum compounds which are preferably admixed with alkali metal compounds as further catalyst constituents. The acrylonitrile yields are especially low.

The process described in Belgian Patent No. 593,097 for the preparation of acrylonitrile and methacrylonitrile from propylene or isobutylene in the presence of ammonia and oxygen uses as the catalyst especially boron phosphate which may be activated at will with altogether 21 metals or their mixtures. The catalyst employed in Example 12 of that Belgian patent contains boron phosphate and tin. Calculated on the propylene conversion rate of merely 27%, the yield of acrylonitrile amounts to 25.5% and that of acetonitrile to 28%. Example 22 in the above-mentioned Belgian patent uses copper, vanadium, titanium and phosphorus; calculated on the propylene conversion rate of 61%, the yield of acrylonitrile amounts to 51% and that of acetonitrile to 20%.

The present invention unexpectedly provides a process for the manufacture of unsaturated nitriles by oxidizing an olefin having 3 to 4 carbon atoms with air and/or oxygen in contact with ammonia and optionally steam at temperatures within the range of 300° C. to 600° C. and pressures within the range of 0.1 to 10 atmospheres absolute within a period of time of 0.05 to 50 seconds on a catalyst, preferably applied to a carrier material, such as silica gel ($SiO_2$), aluminum oxide or pumice, which avoids the disadvantages associated with the conventional processes described above and wherein the oxidation is carried out in the presence of a catalyst containing an oxide mixture of the elements vanadium, tin and optionally phosphorus.

The catalyst preferably contains, per gram atom vanadium, 4.5- to 10-gram atoms tin and 0- to 2-gram atoms phosphorus, each bound in oxide form. If desired, the catalyst may also contain 1 to 2 gram atoms of one of the elements barium, aluminum, titanium, tungsten, antimony, chromium and lead in oxidic form. The finished catalyst consists to an extent of about 50 to 90% by weight of carrier material. The mixture used as starting material for making the catalyst is first dried or sprayed and then calcined at temperatures within the range of 400 to 800° C., preferably 500 to 600° C.

The mixture of olefin-air-ammonia is allowed to stay over the catalyst for a preferred period of time of between about 0.2 to 20 seconds. The ratio by volume of olefin to ammonia to air amounts to about 1:1:7.5 to 1:1.2:10. The oxidation may be carried out with the use of a solid, fluidized or flowing bed catalyst. Aluminum phosphate may also be used as a carrier material for the catalyst according to the present invention.

As compared with the conventional processes described in the above-cited patents, the procedure disclosed in the present invention is novel and enriches the art.

German Patents Nos. 897,560, 941,428, 1,070,170 and French Patent No. 1,098,400 need hardly be considered in using as the starting material unsaturated aldehydes rather than olefins or in being directed to two-stage methods yielding unsaturated aldehyde as an intermediary product. In contrast thereto, the present invention is concerned with a much more favorable one-stage process without acrolein as an intermediary product giving rise to undesired polymerizations.

Contrary to any of the conventional methods disclosed in the above cited patents, the process of the present invention does not use catalysts containing costly molybdenum which, moreover, is volatile under the reaction conditions. Other costly metals, such as tungsten, antimony, and bismuth may also be omitted in the catalysts used in the process according to the present invention, which is in contrast to the procedure shown, for example, in German Patent No. 1,127,351, and yet are the yields obtained higher than or at least equal to those obtained in the conventional processes. A further advantage offered by the present invention resides in the formation of merely minor amounts of undesired acetonitrile.

It has already been mentioned above that Belgian Patent No. 593,097 admittedly describes the use of either vanadium or tin as catalyst components which, however, are admixed with further elements not required in the catalyst used in the process of the present invention, and it is clearly an unexpected result to which great extent the combination of vanadium with tin as taught in the present invention advances the art.

Vanadium and tin when used alone limit the propylene conversion rate to 61% or 27% and the acrylonitrile yield to 51% or 25.5%, calculated on reacted propylene, and they give rise to the formation of comparable proportions of useless acetonitrile, but when used in combination as taught in the present invention, they produce acrylonitrile in yields of about 58%, calculated on the propylene which undergoes conversion to an extent of up to 95%.

The catalyst used in the process of the present invention is relatively very cheap, resistant to abrasion, ensures the reaction to proceed selectively and has a low bulk density of merely 0.3 to 0.4. Most of the conventional catalysts contain as their principal constituents very costly substances, such as molybdenum, bismuth, etc. Losses which imperatively occur during operation by abrasion in the fluidized bed or by evaporation of $MoO_3$ at high reaction temperatures, may therefore contribute to the production costs being considerably increased. A loss of 1% per day of a catalyst prepared in the manner set forth in German Patent No. 1,127,351 results in extra-charges which affect the price for the resulting nitrile in the same manner as would the combustion of about 10 to 15% of the proylene used to carbon oxides, which would be equivalent to a product yield reduced by 10 to 15%. It is therefore obvious that the use of the abrasion-resistant catalyst according to this invention is much more economic. Furthermore, the reaction carried out with the catalyst of the present invention is by far not so much a function of the temperature as the reaction carried out with conventional catalysts. Still further, the reaction of the olefin with ammonia and air must not imperatively be carried out in the presence of water.

The following examples illustrate the most advantageous mode of executing the process of the present invention and modifications thereof.

*Examples 1 to 12*

Preparation of the catalyst.

346 grams tin were dissolved in 1160 grams $HNO_3$ of 68% strength. The resulting and partially colloidal suspension of tin dioxide was introduced, while stirring, into 4000 grams of a 14% aqueous solution of colloidal silicic acid containing 68.5 grams dissolved ammonium vanadate. The suspension obtained could be directly sprayed in an atomizing drier to a catalyst having the desired grain size, or dried by evaporation of the whole mass, and the dry material comminuted in an appropriate manner. The dried and comminuted material (catalyst) was then calcined for 24 hours at temperatures within the range of 400 to 700° C., preferably 500 to 600° C.

The resulting catalyst was composed as follows:

$V_2O_5$:5% by weight.
$SnO_2$:41.8% by weight.
$SiO_2$:53.2% by weight.

The individual elements were present in the atomic ratio:

V:Sn:Si=1:5:16 (Example 5).

The catalysts used in Examples 1 to 12 were prepared in the same manner as set forth above.

Of the catalysts so prepared, 500 cc. each having a grain sibe of 0.1 to 0.4 mm. were used in a heated fluidized bed reactor 150 cm. long and 5 cm. wide. 3 mols propylene, 3 mols ammonia, 6 mols steam and 10 mols air per hour were introduced at a reaction temperature of 500° C. through a premixer into the reactor. The rate of flow in the reactor amounted to 40 to 45 cm./second and the time of stay to about 3.5 seconds.

To determine the propylene conversion rates and the yields, acrylonitrile, hydrogen cyanide and acetonitrile were removed from the off-gas in conventional manner by washing with 2N-sulfuric acid, distilled off from the sulfuric acid solution and crude acrylonitrile was analyzed by conventional analytical methods. The off-gas coming from the sulfuric acid wash, which generally contained residues of unreacted propylene and its decomposition products carbon monoxide and carbon dioxide, was investigated by gas chromatographical methods to determine its constituents. It was found that the catalyst changed its properties as a function of the atomic ratio of V:Sn as follows.

| Example | Ratio V:Sn | Composition of catalyst in percent by weight | | | Propylene conversion in percent | Yield in percent [1] | | |
|---|---|---|---|---|---|---|---|---|
| | | $V_2O_5$ | $SnO_2$ | $SiO_2$ | | Acrylonitrile | HCN | Acetonitrile |
| 1 | 5:1 | 39.1 | 12.9 | 48.0 | 72.5 | 22.5 | 13 | 5 |
| 2 | 2:1 | 27.6 | 22.8 | 49.6 | 72.5 | 23.5 | 8 | 6 |
| 3 | 1:1 | 18.4 | 30.3 | 51.3 | 75 | 29.5 | 8 | 7 |
| 4 | 1:2 | 11.0 | 36.7 | 52.3 | 78 | 32.5 | 6 | 7 |
| 5 | 1:5 | 5.0 | 41.8 | 53.2 | 92 | 33.5 | 5.5 | 7 |
| 6 | 1:6 | 4.2 | 42.3 | 53.5 | 88 | 37 | 3.5 | 7 |
| 7 | 1:7 | 3.6 | 42.9 | 53.5 | 85.5 | 37 | 3.0 | 7.5 |
| 8 | 1:8 | 3.2 | 43.3 | 53.5 | 85.5 | 35.5 | 2.5 | 9 |
| 9 | 1:9 | 2.9 | 43.5 | 53.6 | 83 | 34.5 | 2.0 | 9 |
| 10 | 1:10 | 2.6 | 43.8 | 53.6 | 82 | 33 | 2.0 | 9 |
| 11 | 1:15 | 1.8 | 44.5 | 53.7 | 65 | 22.5 | 1.5 | 12 |
| 12 | 1:20 | 1.3 | 44.7 | 54.0 | 65 | 21 | 1 | 12 |

[1] Here and in the following tables, the yields are always referred to the propylene carbon which underwent conversion on the basic assumption that 1 mol acrylonitrile or 3 mols HCN can be obtained from 1 mol propylene or 3 mols acetonitrile can be obtained from 2 mols propylene.

Example 13

A catalyst prepared in the manner set forth in Example 5 (V:Sn=1:5) modified its catalytic properties as follows as a function of the calcining temperature (thermal aftertreatment).

| Calcining temperature in °C. (duration: 24 hours) | Propylene conversion in percent | Yield in percent | | |
|---|---|---|---|---|
| | | Acrylonitrile | HCN | Acetonitrile |
| 500 | 92 | 33.5 | 5.5 | 7.0 |
| 600 | 85.5 | 38 | 6.5 | 4.0 |
| 700 | 79 | 33 | 10.0 | 4.0 |
| 800 | 50 | 24 | 11.0 | 5.0 |
| 900 | 13 | 11 | 11.0 | 9.0 |

Examples 14 to 18

In a series of catalysts prepared by the process described above, the following dependence of the properties of the catalyst on the amount of carrier material was found to exist for a constant atomic ratio of the active components V:Sn=1:5:

| Example | Ratio V:Sn | Composition of catalyst in percent by weight | | | Propylene conversion in percent | Yield in percent | | |
|---|---|---|---|---|---|---|---|---|
| | | $V_2O_5$ | $SnO_2$ | $SiO_2$ | | Acrylonitrile | HCN | Acetonitrile |
| 14 | 1:5 | 10 | 82.2 | 7.8 | 83 | 37 | 2.5 | 16 |
| 15 | 1:5 | 9.1 | 74.7 | 16.2 | 84.5 | 39.5 | 3 | 16.5 |
| 16 | 1:5 | 8.2 | 67.0 | 24.8 | 86 | 34.5 | 3.5 | 16 |
| 5 | 1:5 | 5.1 | 41.5 | 53.5 | 92 | 33.5 | 5.5 | 7.0 |
| 17 | 1:5 | 2.7 | 21.8 | 75.5 | 71 | 43.5 | 7.5 | 4.5 |
| 18 | 1:5 | 1.4 | 11.3 | 87.3 | 59 | 50 | 7.5 | 3 |

Examples 19 to 23

A catalyst prepared in the manner set forth in Example 5 and containing 53.5% carrier material was admixed with various amounts of phosphoric acid. The catalyst behaved as follows depending on its $P_2O_5$ concentration:

| Example | 53.5 weight percent carrier atomic ratio, V:Sn:P | Propylene conversion in percent | Yield in percent | | |
|---|---|---|---|---|---|
| | | | Acrylonitrile | HCN | Acetonitrile |
| 5 | 1:5:0 | 92 | 33.5 | 5.5 | 7.0 |
| 19 | 1:5:0.1 | 92 | 37 | 4.5 | 5.0 |
| 20 | 1:5:1 | 85 | 47.5 | 8 | 5.5 |
| 21 | 1:5:2 | 66 | 26.5 | 12 | 6 |
| 22 | 1:5:5 | 39.5 | 21 | 16 | 10 |
| 23 | 1:5:10 | 6.6 | 13 | 8 | 6 |

Examples 24 to 26

A catalyst prepared in the manner set forth in Example 18 and containing 87.3% by weight carrier material was admixed with various amounts of phosphoric acid. The following catalyst properties were determined as a function of the $P_2O_5$ concentration.

| Example | 87.3 weight percent carrier atomic ratio, V:Sn:P | Propylene conversion in percent | Yield in percent | | |
|---|---|---|---|---|---|
| | | | Acrylonitrile | HCN | Acetonitrile |
| 18 | 1:5:0 | 59 | 50 | 7.5 | 3 |
| 24 | 1:5:1 | 60 | 50 | 8 | 5.5 |
| 25 | 1:5:2 | 39.5 | 46 | 12 | 6 |
| 26 | 1:5:5 | 6.6 | 23.5 | 18 | 13 |

Examples 27 to 36

Catalysts prepared in the manner described in Example 18 and in Example 24, respectively (1.3% by weight $V_2O_5$; 10.7% by weight $SnO_2$; 1.0% by weight $P_2O_5$; and 87.0% by weight $SiO_2$), were admixed with appropriate metal oxides which modified the catalytic properties as follows:

| Example | Addition | Atomic ratio, V:Sn:P:addition | Propylene conversion in percent | Yield in percent | | |
|---|---|---|---|---|---|---|
| | | | | Acrylonitrile | HCN | Acetonitrile |
| 18 | | 1:5:0:0 | 59 | 50 | 7.5 | 3.0 |
| 27 | Ba | 1:5:0:1 | 45 | 43 | 4.5 | 5.5 |
| 24 | | 1:5:1:0 | 60 | 50 | 8 | 5.5 |
| 28 | Ba | 1:5:1:1 | 49 | 55 | 6 | 8 |
| 29 | Ti | 1:5:0:1 | 54 | 47 | 6 | 4.5 |
| 30 | Ti | 1:5:1:1 | 57 | 52 | 7 | 5.5 |
| 31 | Al | 1:5:0:1 | 58 | 48.5 | 7 | 4.5 |
| 32 | Al | 1:5:1:1 | 67.5 | 48.5 | 7 | 5 |
| 33 | W | 1:5:0:1 | 46 | 47 | 12 | 8 |
| 34 | Sb | 1:5:1:1 | 90 | 33 | 6 | 5 |
| 35 | Cr | 1:5:1:1 | 82 | 40 | 5 | 7 |
| 36 | Pb | 1:5:1:1 | 57 | 35 | 5 | 7 |

Examples 37 to 40

3.5 litres of the catalysts prepared in the manner set forth in Examples 18, 20 and 24 (bulk density: 0.4 to 0.5; grain size: 0.2 to 0.3 mm.; calcining temperature: 500 to 600° C.) were used in a fluidized bed reactor 5 metres long and 5 cm. wide. At a reaction temperature of 500 to 550° C., a velocity of flow of 1.0 to 1.5 m./second and a time of stay of 3 to 5 seconds, 10 mols propylene, 10 to 12 mols ammonia, 0 to 50 mols water and 100 mols air were introduced per hour through a preheater into the reactor. The whole was processed in conventional manner, the resulting reaction products were analyzed and the following results obtained:

| Example | Mols H²O | Catalyst of example | Propylene conversion in percent | Yield in percent | | |
|---|---|---|---|---|---|---|
| | | | | Acrylonitrile | HCN | Acetonitrile |
| 37 | 27 | (18) | 85 | 53 | 18 | 2 |
| 38 | 28 | (20) | 96 | 58 | 11 | 2 |
| 39 | 0 | (20) | 95 | 58 | 12 | 1.5 |
| 40 | 27 | (24) | 95 | 57 | 8 | 2.5 |

The substantially higher propylene conversion rates and acrylonitrile yields obtained in Examples 37 to 40 were due to the greater dimensions of the reactor in which these experiments were carried out. In other words, the catalyst was still more efficient when used in a thicker and more homogeneous layer in a fluidized bed.

Example 41

The fluidized bed reactor used in Examples 37 to 40 was charged with a catalyst in which V and Sn were used in the atomic ratio of 1:5 and which contained 82.2% by weight aluminum phosphate as the carrier material, corresponding to the composition: 1.9% by weight $V_2O_5$; 15.9% by weight $SnO_2$; 51.2% by weight $Al_2O_3$ and 31% by weight $P_2O_5$ (corresponding to 82.2% by weight $AlPO_4$ as the carrier material). At a reaction temperature of 450 to 500° C., a velocity of flow of 1 to 1.5 metres per second and a time of stay of 3 to 5 seconds, 10 mols propylene, 10 to 12 mols ammonia, 50 mols water and 100 mols air were introduced per hour through a preheater into the reactor. The propylene conversion rates were as high as 75 to 90% and acrylonitrile was obtained in yields of 50 to 60%, HCN in yields of 11 to 12% and acetonitrile in yields of about 1.5%.

The phosphorus content of the $AlPO_4$=carrier is not an active component, the phosphoric acid being present in neutralized form. If, therefore, the catalysts according to the present invention contain V:P, for example in the atomic ratio of 1:1, this ratio should be interpreted to merely include the phosphorus not bound by $Al_2O_3$.

We claim:
1. In a one-stage process for the manufacture of a compound selected from the group consisting of acrylonitrile and methacrylonitrile by reacting an olefin selected from the group consisting of propylene and isobutylene, respectively, with at least one substance selected from the group consisting of air and oxygen in the presence of ammonia, the ratio by volume of olefin:ammonia:air being within the range of about 1:1:7.5 to 1:1.2:10 at a temperature of about 300 to 600° C., under a pressure of about 0.1 to 10 atmospheres absolute and within a period of time of about 0.05 to 50 seconds on a catalyst applied to a carrier, the improvement which consists in carrying out the reaction in contact with the said catalyst consisting essentially of about 4.5 to 10 gram atoms tin in the form of $SnO_2$ per gram atom vanadium in the form of $V_2O_5$, and about 50 to 90% by weight of a carrier material selected from silicic acid and aluminum phosphate, the catalyst having been calcined at a temperature of about 400 to 800° C.

2. The process of claim 1 wherein the catalyst additionally contains up to 5 gram atoms phosphorus in the form of $P_2O_5$ per gram atom vanadium in the form of $V_2O_5$.

3. The process of claim 1 wherein the catalyst has been calcined at a temperature of about 500 to 600° C.

4. The process of claim 1 wherein the mixture of olefin, air and ammonia is reacted within about 0.2 to 20 seconds in contact with the catalyst.

5. The process of claim 1 wherein the reaction is carried out in contact with a solid bed catalyst.

6. The process of claim 1 wherein the reaction is carried out in contact with a fluidized bed catalyst.

7. The process of claim 1 wherein the reaction is carried out in contact with a flowing bed catalyst.

8. The process of claim 1 wherein the reaction is carried out in the presence of up to 50 mols steam per 10 mols olefin.

(References on following page)

References Cited

UNITED STATES PATENTS

| | | | |
|---|---|---|---|
| 2,481,826 | 9/1949 | Cosby | 260—465.3 |
| 2,691,037 | 10/1954 | Bellringer et al. | 260—465.3 |
| 3,009,943 | 11/1961 | Hadley et al. | 260—465.3 |
| 3,135,783 | 6/1964 | Sennewald et al. | 260—465.3 |
| 3,142,697 | 7/1964 | Jennings et al. | 260—465.3 |
| 3,152,170 | 10/1964 | Barclay et al. | 260—465.3 |
| 3,153,665 | 10/1964 | Roelen et al. | 260—465.3 |
| 3,332,978 | 2/1966 | Yasuhara et al. | 260—465.3 |

FOREIGN PATENTS

| | | |
|---|---|---|
| 619,497 | 5/1961 | Canada. |
| 1,269,382 | 7/1961 | France. |

CHARLES B. PARKER, *Primary Examiner.*

JOSEPH P. BRUST, *Examiner.*